(12) United States Patent
Fontana et al.

(10) Patent No.: US 8,195,941 B2
(45) Date of Patent: Jun. 5, 2012

(54) AUTHENTICATION METHOD FOR IC CARDS

(75) Inventors: Giovanni Fontana, Naples (IT); Saverio Donatiello, Mercogliano (IT)

(73) Assignee: Incard S.A., Geneva (CH)

( * ) Notice: Subject to any disclaimer, the term of this patent is extended or adjusted under 35 U.S.C. 154(b) by 1347 days.

(21) Appl. No.: 11/769,781

(22) Filed: Jun. 28, 2007

(65) Prior Publication Data

US 2008/0016351 A1    Jan. 17, 2008

(30) Foreign Application Priority Data

Jun. 29, 2006    (EP) .................................. 06013462

(51) Int. Cl.
*H04L 9/32* (2006.01)
(52) U.S. Cl. ........ 713/169; 713/155; 713/159; 713/185; 713/186; 713/193; 235/492; 380/44
(58) Field of Classification Search .................. 713/155, 713/159, 171, 185–186, 193; 235/492; 380/44
See application file for complete search history.

(56) References Cited

U.S. PATENT DOCUMENTS

| | | | | |
|---|---|---|---|---|
| 4,746,788 A * | 5/1988 | Kawana | ........................ | 235/380 |
| 6,931,379 B1 * | 8/2005 | Sato et al. | ........................ | 705/50 |
| 7,357,329 B2 * | 4/2008 | Sakamura et al. | ............ | 235/492 |
| 7,610,492 B2 * | 10/2009 | Awatsu et al. | ................ | 713/186 |

FOREIGN PATENT DOCUMENTS

| | | |
|---|---|---|
| EP | 0817420 | 1/1998 |
| EP | 1225533 | 7/2002 |
| EP | 1396824 | 3/2004 |
| EP | 1533706 | 5/2005 |
| WO | 99/64996 | 12/1999 |

OTHER PUBLICATIONS

Ferreira, "*The Smart Card: A High Security Tool in EDP*", Philips Telecommunication Review, vol. 47, No. 3, Sep. 1, 1989.

\* cited by examiner

*Primary Examiner* — Thanhnga B Truong
(74) *Attorney, Agent, or Firm* — Allen, Dyer, Doppelt, Milbrath & Gilchrist, P.A.

(57) ABSTRACT

An authentication method between a first IC card and a second IC card interconnected through a terminal includes transmitting an identification number from the second IC card to the first IC card for deriving and storing a key in the first IC card. An authentication number is generated and stored in the first IC card, and is transmitted to the second IC card. The authentication number is encrypted inside the second IC card, and is transmitted to the first IC card. The encrypted authentication number is decrypted through the derived key, and is compared with the authentication number. The second IC card is authorized if the encrypted authentication number in the first IC card is equal to the authentication number. At least one of the transmissions includes an identification and/or authentication number to authorize the first IC card from the second IC card. The identification and/or authentication numbers include a reverse authentication number.

22 Claims, 3 Drawing Sheets

AUTHENTICATION METHOD FOR IC CARDS

FIELD OF THE INVENTION

The present invention relates to an authentication method between a first IC card and a second IC card interconnected through a terminal. More particularly, the first and second IC cards communicate with one another if they both authenticate each other.

BACKGROUND OF THE INVENTION

An authentication method is generally executed between a first and a second IC card, before starting a communication, in order to mutually ensure that the first IC card is authorized to read information stored in the second IC card. Similarly, the second IC card may be authorized to read information stored in the first IC card.

More particularly, an authentication method is used to provide an authentication between a first and a second IC card interconnected and communicating through an interface terminal. The first IC card comprises at least a first memory unit storing a first plurality of data and the second IC card comprises at least a second memory unit storing a second plurality of data.

Generally, at least a portion of the first and the second plurality of data are secret and require protection. This is because they comprise sensitive data or information used in secure transactions of a banking application, for example. In a banking application, as schematically shown in FIG. 1, a POS terminal 3 respectively connects a first SAM IC card 1 and a second user IC card 2 through a first slot 3a and a second slot 3b provided from the POS terminal 3 itself.

The first SAM IC card 1 comprises at least a first memory unit 1a storing a first plurality of data, and the second user IC card 2 comprises at least a second memory unit 2a including a second plurality of data. The authentication between the SAM IC card 1 and the user IC card 2 is generally implemented through an authentication method that is briefly described below.

The first memory unit 1a inside the SAM IC card 1 holds a Master Key 1M and a Function 1F. The Function 1F is used to derive an additional Key relating to a user IC card 2 inserted in the second slot 3b of the POS terminal 3. More particularly, such an additional key, hereinafter indicated as Child Unique Keys 1K, is used to implement the mutual authentication between the SAM IC card 1 and the user IC card 2.

The authentication method provides that an IC card identification number, for example an IC card serial number 2sn generally stored inside the second memory unit 2a of a user IC card 2, is transmitted to the SAM IC card 1. The Function 1F processes through the Master key 1M and the IC card serial number 2sn a Child Unique Key 1K to be used to authenticate a corresponding user IC card 2.

The SAM IC card 1 also generates a random number 1rand, stores it in the first memory unit 1a, and sends it to the user IC card 2. The user IC card 2 reads the random number 1rand through the POS terminal 3, encrypts it and sends it back to the SAM IC card 1 as an encrypted random number 2enc-rand.

The SAM IC card 1 may decrypt the encrypted random number 2enc-rand through the Child Unique Key 1K corresponding to the user IC card 2 inserted in the second slot 3b, and previously stored inside the first memory unit 1a. The result of such a decryption is compared to the random number 1rand stored inside the first memory unit 1a of the SAM IC card 1.

If the result of the decryption is equal to the random number 1rand previously stored, the SAM IC card 1 authenticates the user IC card 2, otherwise the SAM IC card 1 rejects the user IC card 2. More particularly, if the SAM IC card 1 authenticates the user IC card 2, a reverse authentication method, called from the user IC card 2 and intended to authenticate the SAM IC card 1, is performed. The reverse authentication method substantially comprises all the computations described above to authenticate the user IC card 2.

The authentication method typically comprises a large amount of communications between the SAM IC card 1 and the user IC card 2. In particular, each communication is intended to send an initialization message of the authentication method between the two IC card 1, 2; an IC card serial number 2sn from the user IC 2 to the SAM IC card 1; a random number 1rand from the SAM IC card 1 to the user IC card 2; an encrypted Random number 2enc-rand from the user IC card 2 to the SAM IC card 1; and an acknowledge or a non-acknowledge message from the SAM IC card 1 to the user IC card 2, respectively intended to start or to refuse the following communication between the two IC cards.

Moreover, when the authentication from the SAM IC card 1 to the user IC card 2 is completed, a mutual authentication from the user IC card 2 to the SAM IC card 1 needs to be performed. This mutual authentication comprises a corresponding plurality of communications.

When a communication between the SAM 1 and a user IC card 2 is terminated, a new communication between another user IC card 2 and the SAM IC card 1 may start. The Function 1F processes another Child Unique Key 1K through the Master key 1M and through another IC card serial number 2sn stored inside the user IC card 2, and an authentication is processed.

A considerable number of interactions between the SAM 1 and the user IC card 2 makes the authentication method time consuming, thus reducing the throughput of the POS terminal 3 and limiting the number of services rendered to the corresponding user IC card 2.

At the same time, with more communications between the SAM 1 and the user IC card 2, the authentication method becomes more susceptible. Each communication is exposed to a potential external attack intended to intercept data.

The problem is that the authentication method performs a number of communications between a SAM IC card 1 and a user IC card 2 that exposes the secure data stored inside the corresponding memory units to potential risks. This is both due to the time required to complete the mutual authentication and to the number of interchanges required by the authentication method itself. This also reduces the throughput of the terminal that sequentially interconnects a plurality of user IC cards with the same SAM IC card.

SUMMARY OF THE INVENTION

In view of the foregoing background, an object is to reduce the communications steps between a SAM IC card and a user IC card by providing an authentication method capable of providing at least the same level of security as provided by prior art authentication methods but without being time consuming in the authentication phase.

This and other objects, advantages and features are provided by an authentication method between a first IC card and a second IC card interconnected through a terminal comprising the step of transmitting an identification number from the second IC card to the first IC card for deriving a key in the first IC card, generating and storing an authentication number in the first IC card and transmitting it to the second IC card, and encrypting the authentication number in an encrypted authentication number inside the second IC card.

The encrypted authentication number may be transmitted it the first IC card. The method may further comprise decrypting through the key the encrypted authentication number, and comparing it with the authentication number. The second IC card may be authenticated if the encrypted authentication number inside the first IC card is equal to the authentication number. The at least one transmission included in the steps may comprise one or more identification and/or authentication numbers intended to authorize the first IC card from the second IC card.

BRIEF DESCRIPTION OF THE DRAWINGS

Further characteristics and the advantages of the authentication method according to the present invention will be apparent from the following description of an embodiment thereof, made with reference to the annexed drawings, given for illustrative and non-limiting purposes.

DETAILED DESCRIPTION OF THE PREFERRED EMBODIMENTS

Figure 1:
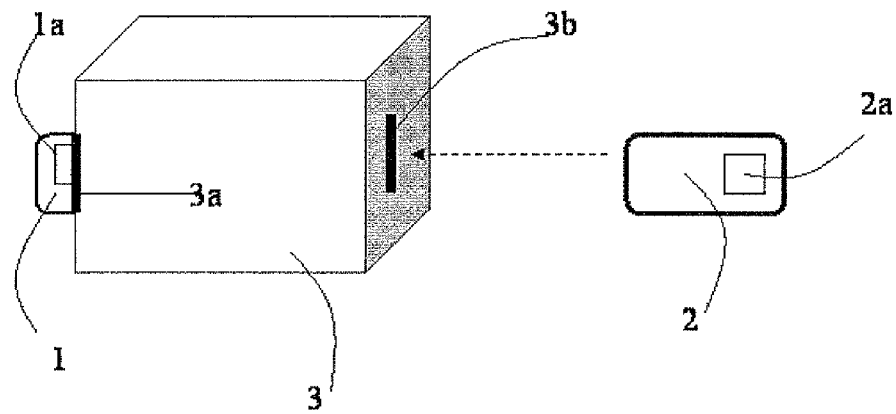
FIG. 1 schematically shows a POS terminal interconnecting a user IC card with a SAM IC card, according to the prior art.
Figure 2A:
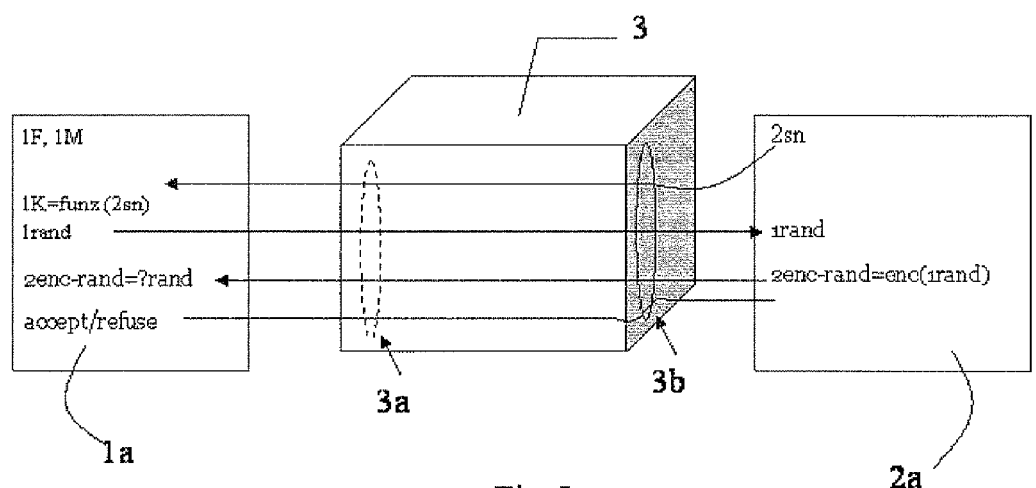
FIG. 2a schematically shows a sequence of communication steps processed by an authentication method for authenticating a user IC card from a SAM IC card, according to the prior art.
Figure 2B:
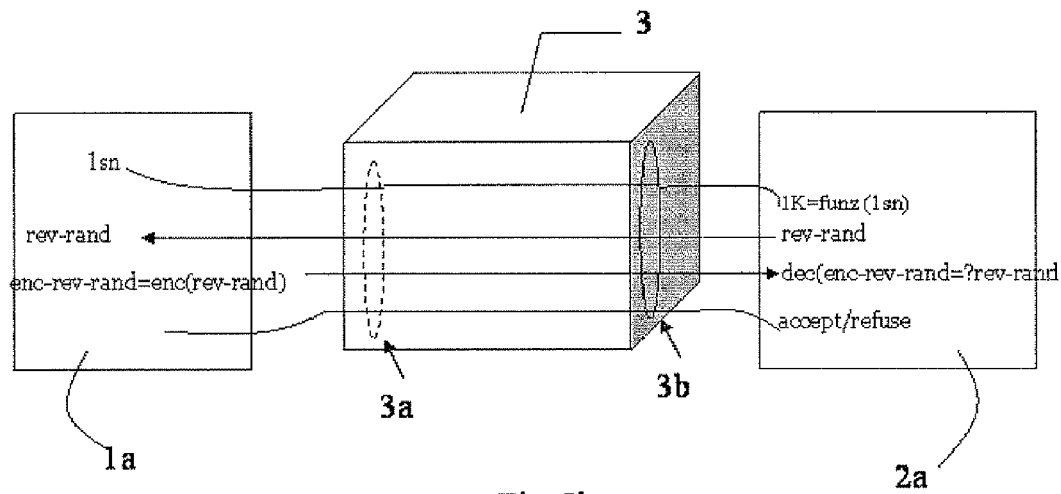
FIG. 2b schematically shows a sequence of communication steps processed by an authentication method for authenticating a SAM IC card from a user IC card, according to the prior art.
Figure 3:
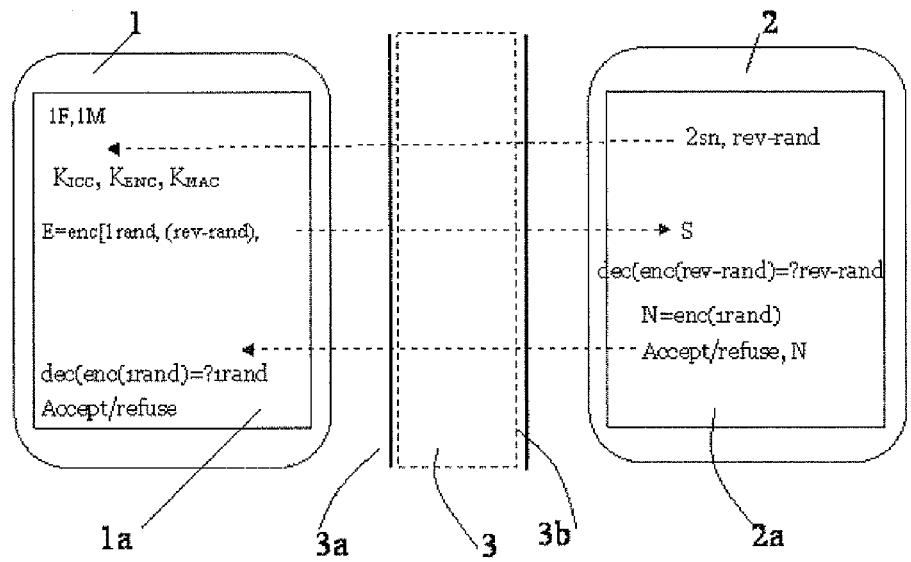
FIG. 3 schematically shows a sequence of communication steps driven by an authentication method for authenticating a user IC card from a SAM IC card and vice versa, according to the present invention.
Figure 4:
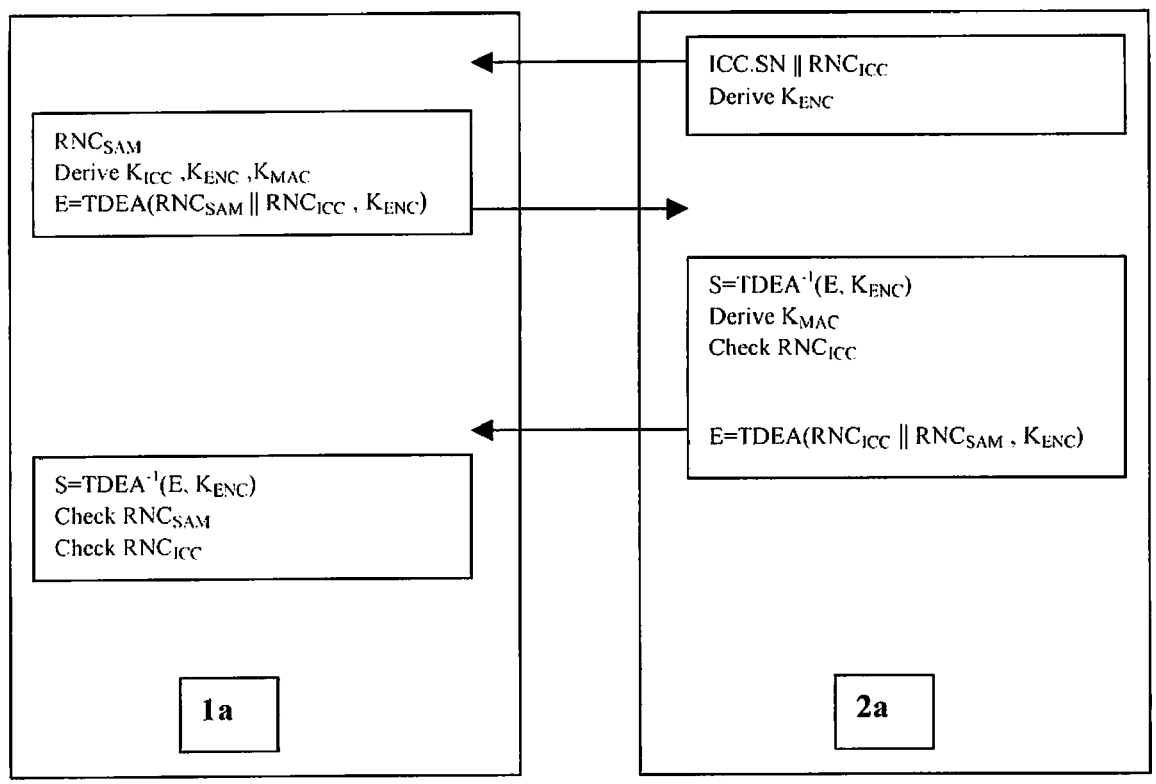
FIG. 4 schematically shows in more detail the sequence of communication steps driven by an authentication method, according to the present invention

With more specific reference to FIG. 3, a plurality of communication steps driven by an authentication method according to the present invention involving a first SAM IC card 1 and a second user IC card 2 are schematically represented and globally indicated with reference numeral 10.

More particularly, the SAM IC card 1 is inserted in a first slot 3a of a POS terminal 3 and the user IC card 2 is inserted in a second slot 3b of the POS terminal 3. The SAM IC card 1 comprises a first memory unit 1a storing a Master Key 1M and a Function 1F while the user IC card 2 comprises a second memory unit 2a storing an identification number. The identification number may be an IC card serial number 2sn, for example.

More particularly, such a plurality of steps comprises one or more data transmissions sent from the SAM IC card 1 to the user IC card 2, and one or more data transmissions sent from the user IC card 2 to the SAM IC card 1. The authentication method provides that, during the transmission data required to perform the authentication of the user IC card 2 by the SAM IC card 1, data to perform the reverse authentication from the user IC card 2 to the SAM IC card 1 are sent.

More particularly, the authentication method provides that the serial number 2sn is sent from the user IC card 2 to the SAM IC card 1 to compute, through the Function 1F and the Master Key 1M, a Child Unique Key 1K. When the serial number 2sn is sent from the user IC card 2 to the SAM IC card 1, it is also sent a random number generated by the same user IC card 2 for authenticating the SAM IC card 1 by the user IC card 2. The transmission of this random number, hereinafter indicated as a reverse random number rev-rand, would be required by the authentication method to recognize the SAM IC card 1 by the user IC card 2. Advantageously, the transmission of the random number rev-rand is anticipated and encapsulated inside the authentication method to recognize the user IC card 2 by the SAM IC card 1.

In other words, at least one transmission intended to authenticate the user IC card 2 by the SAM IC card 1 is contemporarily used to authenticate the SAM IC card 1 by the user IC card 2. According to the prior art, a reverse random number rev-rand should be generated only during a second step of the communications. This is directed to authenticate the SAM IC card 1 by the user IC card 2.

The steps directed to authenticate the SAM IC card 1 by the user IC card 2 advantageously starts inside the steps directed to authenticate the user IC card by the SAM IC card. This speeds up the mutual authentication of both IC cards.

After the serial number 2sn and the reverse random number rev-rand are sent from the user IC card 2 to the SAM IC card 1, the authentication method advantageously provides that the SAM IC card 1 derives a plurality of encryption keys $K_{ICC}$, $K_{ENC}$ and $K_{MAC}$ and generate a SAM random number 1rand. The SAM random number 1rand is used by the SAM IC card 1 to authenticate the user IC card 2, as substantially described above.

Both the reverse random number rev-rand and the SAM random number 1rand are included and transmitted in a message E from the SAM IC card 1 to the user IC card 2 advantageously using a first encrypted format generated through the key $K_{ENC}$. The authentication method provides that the user IC card 2 decrypts the message E in a message S. This is for retrieving the reverse random number rev-rand. The retrieved reverse random number rev-rand is compared with the one stored previously inside its memory unit 2a. In this way, the user IC card 2 may authenticate the SAM IC card 1.

Also, the authentication process from SAM IC card 1 to user IC card 2 is almost finished. The authentication method provides that the user IC card 2 encrypts the SAM random number 1rand with the key $K_{ENC}$, including it in a message E and sending it to the SAM. In this way, SAM IC card 1 authenticates user IC card 2.

The response of SAM IC card 1 to the query of authentication required by user IC card 2 not only contains information to satisfy such authentication, but also information to start a reverse authentication from SAM IC card 1 to user IC card 2.

An embodiment of the present description is described below in more detail. More particularly, the following acronyms are used:

SAM: a SAM IC card (1).
ICC: a user IC card (2).
IFD: a terminal (3) communicating with the SAM and the ICC.
MAC: an acronym for Message Authentication Code representing a method to verify data integrity.
MATM: the Authentication method according to the present invention.
TDEA: the TripleDES algorithm $K_{ICC}$: a 16-bytes key used to derive a key session, more particularly, each ICC stores a different key $K_{ICC}$.

$K_{ENC}$: a 16-bytes key used to encrypt a given data.

$K_{KAC}$: a 16-bytes key used to create a MAC on a given data.

$RND_{ICC}$: a 8-byte random generated by the ICC.

$RND_{SAM}$: a 8-byte random generated by the SAM.

An embodiment of the authentication method according to the present invention, for a general TRANSIT APPLICATION and without limitation on the number or type of operations executed, comprises the steps schematically shown in the following TABLE 1.

More particularly, the first column of the table represents the operations executed by the SAM and the transmission of data from SAM to IFD. The second column represents the operations executed by the IFD and the transmission of data from IFD to SAM and/or ICC. Finally, the third column represents the operations executed by the ICC and the transmission of data from ICC to IFD.

TABLE 1

| Step | SAM | IFD | ICC |
|---|---|---|---|
| 1. | | ← SELECT TRANSIT APPLICATION | |
| 2. | 1. The SAM loads the security environment for the TRANSIT APPLICATION | | |
| 3. | | SELECT TRANSIT APPLICATION. → | |
| 4. | | | a. The ICC loads the security environment for the TRANSIT APPLICATION |
| 5. | | INIT MUTUAL AUTHENTICATION → | |
| 6. | | | a. The ICC generate $RND_{ICC}$ ← $RND_{ICC}$ ∥ ICC.SN ∥ SP b. The ICC derives $K_{ENC}$ |
| 7. | | ← INIT M. AUTH. ($RND_{ICC}$ ∥ ICC.SN ) | |
| 8. | The SAM generates $RND_{SAM}$ The SAM derives $K_{ICC}$, $K_{ENC}$ and $K_{MAC}$ The SAM computes: $E_{SAM}$ = TDEA ($RND_{SAM}$ ∥ $RND_{ICC}$, $K_{ENC}$) $E_{SAM}$ → | | |
| 9. | | MUTUAL AUTHENTICATION ($E_{SAM}$) → | |
| 10. | | | The ICC computes: S = $TDEA^{-1}$ ($E_{SAM}$, $K_{ENC}$) The ICC compares the $RND_{ICC}$ received in S with the $RND_{ICC}$ generated at step 6. If the two RNDs are equal then the ICC proceeds, otherwise an Authentication error is returned and a new mutual authentication process is required. |

TABLE 1-continued

| Step | SAM | IFD | ICC |
|---|---|---|---|
| | | | The ICC derives $K_{MAC}$<br>The ICC computes $E_{ICC} = TDEA (RND_{ICC} \| RND_{SAM}, K_{ENC})$<br>← $E_{ICC}$ |
| 11. | | ← TERMINATE MUTUAL AUTHENTICATION ($E_{ICC}$) | |
| 12. | The SAM computes: $S = TDEA^{-1} (E_{ICC}, K_{ENC})$<br>The SAM compares the $RND_{SAM}$ received in S with the $RND_{SAM}$ generated at step 8. If the two RNDs are equal then the SAM proceeds, otherwise an Authentication error is returned and a new mutual authentication process is required.<br>The SAM compares the $RND_{ICC}$ received in S with the $RND_{ICC}$ received at step 7. If the two RNDs are equal then the SAM proceeds, otherwise an Authentication error is returned and a new mutual authentication process is required. | | |
| 13 | | DECREASE (AMT) →<br>1. The IFD computes $C0 = CRC (DECREASE (AMT))$ | |
| 14 | | | 1. The ICC computes $C0 = CRC (DECREASE (AMT))$ |
| 15 | | UPDATE RECORD 1 ($DATA_1$) →<br>1. The IFD computes $C_1 = CRC (UPDATE RECORD 1 (DATA_1))$ | |
| 16 | | | 1. The ICC computes $C_1 = CRC (UPDATE RECORD 1 (DATA_1))$ |
| … … | … | … | … |
| … … | … | … | … |
| 17 | | UPDATE RECORD N ($DATA_N$) → | |

TABLE 1-continued

| Step | SAM | IFD | ICC |
|---|---|---|---|
| 18 | | 2. The IFD computes $C_N$ = CRC (UPDATE RECORD N ($DATA_N$)) | 2. The ICC computes $C_N$ = CRC (UPDATE RECORD N ($DATA_N$)) |
| 19 | | ← PSO CCC ($C_N$|| ... ||$C_1$|| $C_0$) | |
| 20 | 1. The SAM computes: M = MAC($C_N$|| ... ||$C_1$||$C_0$, $K_{MAC}$) M → | | |
| 21 | | PERFORM TRANSACTION OPERATION COMMIT (M) → | |
| 22 | | | 1. The ICC computes $M^1$ = MAC ($C_N$|| ... ||$C_1$||$C_0$, $K_{MAC}$) 2. The ICC compares $M^1$ with M. If the two MACs are equal then the ICC proceed with the file/counter data updating otherwise no file/counter update takes place, a new mutual authentication process is required and a failure condition is returned. |

The following features of the authentication method should be noted. The authentication method MATM starts with a proprietary APDU Init Mutual Authenticate sent from IFD to ICC (step 6). The ICC generates a $RND_{ICC}$ and then it derives $K_{ENC}$. The ICC sends the response composed by the serial number ICC.SN. The random $RND_{ICC}$. SP is a security parameter comprising checking information, for example a padding to be used or the hashing method (CRC, SHA-1, MD5, RIPEMD-160 etc.) to be used on the exchanged transaction data.

The IFD sends the proprietary APDU Init Mutual Authenticate to the SAM including the serial number ICC.SN and the random $RND_{ICC}$ (step 7). The SAM generates $RND_{SAM}$ and derives $K_{ICC}$, $K_{ENC}$ and $K_{MAC}$. The SAM computes the value $E_{SAM}$, for example encrypting with algorithm TDEA and the key $K_{ENC}$, the 16 bytes data formed concatenating $RND_{SAM}||RND_{ICC}$, and sends the response $E_{SAM}$ to ICC (step 8). The IFD sends the proprietary APDU Mutual Authenticate to ICC with body $E_{SAM}$ (step 9).

The ICC decrypts the value $E_{SAM}$, extracts $RND_{ICC}$ and verifies if it is the expected value. Then ICC extracts the $RND_{SAM}$ and derives $K_{MAC}$. The ICC computes the value $E_{ICC}$ encrypting with algorithm TDEA and the key $K_{ENC}$ the 16 bytes data formed concatenating $RND_{ICC}||RND_{SAM}$ and sends the response $E_{ICC}$ (step 10).

More particularly, the concatenation between $RND_{ICC}$ and $RND_{SAM}$ at step 10 is inverted with respect to their concatenation at step 8, wherein $RND_{SAM}$ stays before $RND_{ICC}$. In this way, the ICC must necessarily decrypt the concatenation of $RND_{ICC}$ and $RND_{SAM}$ before replying with the inverted concatenation.

The IFD sends the proprietary APDU Terminate Mutual Authenticate to the SAM with the value $E_{ICC}$ (step 11). The SAM decrypts the value $E_{ICC}$ extracts $RND_{SAM}$ and $RND_{ICC}$ and verifies if they are the expected values. At this point, both ICC and SAM have been authenticated from the other one (step 12).

A series of APDUs may now be sent between ICC and IFD. During this exchange of data both ICC and IFD update the own digest on the exchanged transaction data using the hashing method defined in the security parameter (SP). If the CRC method is used, both the ICC and IFD update the own CRC value sequence $C_0, C_1, \ldots C_N$.

The CRC value sequence $C_0, C_1, \ldots C_N$ is sent by the IFD to SAM using the APDU PSO CCC. The SAM computes the MAC M on the sequence with the key $K_{MAC}$ and it sends M in the response. The IFD sends M to ICC via the proprietary APDU, Perform Transaction Operation Commit. The ICC computes its own MAC $M^1$ on its own CRC value sequence $C_0, C_1, \ldots C_N$ and compares $M^1$ with M. If the two MACs are equal then the ICC proceeds with an update. Otherwise, no file update takes place.

In conclusion, the illustrated authentication method is based on three macro phases: an Initial Mutual Authenticate phase for the initialization of the method, a core Mutual Authenticate phase, and a Terminate Mutual Authenticate phase.

Advantageously, the core Mutual Authenticate phase comprises the generation of $RND_{ICC}$ and $RND_{SAM}$ for generating session keys, the creation of keys session $K_{ENC}$, $K_{MAC}$ for authenticating both the IC card (ICC/SAM) and the subsequently file-updating data, and the starting of the secure transaction on the ICC.

After successful ending of core Mutual Authenticate phase, it is possible to read and/or update files stored in the ICC card. During the whole process of file-updating, both the terminal IFD and IC card update their own digest values. For example, a CRC ISO 3309 CRCB may be used or a SHA-1. The last value of the digest is the input to final MAC computations.

The MAC is computed separately using the key $K_{MAC}$ by both the SAM and the ICC. Finally, the ICC compares the two separately computed MACs. If the comparison is successful, then all the file-updating operations are confirmed, otherwise the previous file content is restored.

The Mutual authentication method according to the present invention advantageously makes faster the bi-directional authentication between a SAM IC card and user IC card. This is a key requirement, especially for an authentication method based on contact-less communication, at the same time without affecting the security of the communication itself.

A plurality of steps allowing the user IC card to authenticate a SAM IC card are encapsulated inside the steps intended to allow the SAM IC card to authenticate the user IC card. The steps include the generation of random or identification number, and the derivation of one or more keys to be used for encrypting and decrypting the random or identification number.

The authentication method not only speeds up the mutual authentication of a couple of IC cards interconnected through a terminal, but also reduces the number of transmissions required by the mutual authentication. This advantageously improves security of the communication system comprising the terminal and the IC cards in order to increase the throughput of the terminal itself.

That which is claimed:

1. A method of authentication between a first IC card and a second IC card, the method comprising:
   transmitting an identification number from the second IC card to the first IC card for deriving a key in the first IC card;
   generating and storing a random number in the first IC card and transmitting the random number to the second IC card;
   encrypting the random number in the second IC card and transmitting the encrypted random number to the first IC card;
   decrypting the encrypted random number in the first IC card using the key and comparing it with the stored random number to thereby authenticate the second IC card; and
   including at least one number to authorize the first IC card in at least one of the transmitting steps associated with authenticating the second IC card.

2. A method according to claim 1, wherein the number to authorize the first IC card comprises a second random number.

3. A method according to claim 2, wherein the second random number is included with the transmitting of the identification number.

4. A method according to claim 1, wherein the number to authorize the first IC card comprises an encrypted second random number.

5. A method according to claim 4, wherein the encrypted second random number is included with the transmitting of the random number.

6. A method according to claim 2, wherein the second random number is generated and stored in the second IC card.

7. A method according to claim 2, further comprising deriving at least one second key in the second IC card to encrypt the identification number and the second random number.

8. A method according to claim 2, wherein the second random number is included with the transmitting of the encrypted random number.

9. A method according to claim 2, further comprising deriving at least one third key in the first IC card to encrypt the random and the second random number.

10. A method according to claim 1, further comprising storing at least one encryption algorithm in the first IC card and the second IC card.

11. A method according to claim 1, further comprising storing at least one decryption algorithm in the first IC card and the second IC card.

12. A method according to claim 1, wherein the first and second IC cards are interconnected through a terminal.

13. A method of authentication between a first IC card and a second IC card interconnected through a terminal, the method comprising:
   transmitting an identification number from the second IC card to the first IC card for deriving a key in the first IC card;
   generating and storing a random number in the first IC card and transmitting the random number to the second IC card;
   encrypting the random number in an encrypted random number in the second IC card and transmitting the encrypted random number to the first IC card;
   decrypting the encrypted random number in the first IC card using the key and comparing it with the stored random number to thereby authenticate the second IC card; and
   including a second random number to authorize the first IC card in at least one of the transmitting steps associated with authenticating the second IC card.

14. A method according to claim 13, further comprising storing at least one encryption algorithm in the first IC card and the second IC card.

15. A method according to claim 13, further comprising storing at least one decryption algorithm in the first IC card and the second IC card.

16. A method according to claim 13, wherein the second random number is generated and stored in the second IC card.

17. A method according to claim 13, wherein the second random number is included with the transmitting of the identification number.

18. A method according to claim 13, wherein the second random number is included with the transmitting of the encrypted random number.

19. A method according to claim 13, further comprising deriving at least one second key in the second IC card to encrypt the identification number and the second random number.

20. A method according to claim 13, further comprising deriving at least one third key in the first IC card to encrypt the random number and the second random number.

21. A smart card system comprising:

a first IC card, a second IC, and a terminal temporarily coupling said first and second IC cards;

said second IC card transmitting an identification number to said first IC card for deriving a key in the first IC card;

said first IC card generating and storing a random number and transmitting the random number to the second IC card;

said second IC card encrypting the random number in an encrypted random number and transmitting the encrypted random number to the first IC card;

said first IC card decrypting the encrypted random number using the key and comparing it with the stored random number to thereby authenticate the second IC card; and at least one of said first IC card and second IC card transmitting at least one number to authorize said first IC card during at least one of the transmitting an identification number, transmitting the random number, and transmitting the encrypted random number.

22. A smart card system according to claim 21, wherein the second random number is included with the transmitting of at least one of the identification number and encrypted random number.

* * * * *